United States Patent
Zhu (10) Patent No.: US 7,948,971 B2
(45) Date of Patent: May 24, 2011

(54) METHOD AND DEVICE FOR CONTROLLING MEDIA RESOURCES, METHOD AND SYSTEM FOR ESTABLISHING CALLS

(75) Inventor: Ning Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 12/327,304

(22) Filed: Dec. 3, 2008

(65) Prior Publication Data

US 2009/0080449 A1 Mar. 26, 2009

Related U.S. Application Data

(63) Continuation of application No. PCT/CN2007/001775, filed on Jun. 5, 2007.

(30) Foreign Application Priority Data

Jun. 5, 2006 (CN) .......................... 2006 1 0083549
Oct. 13, 2006 (CN) .......................... 2006 1 0141146

(51) Int. Cl.
H04L 12/66 (2006.01)
(52) U.S. Cl. ........................................ 370/352; 370/401
(58) Field of Classification Search .................. None
See application file for complete search history.

(56) References Cited

U.S. PATENT DOCUMENTS

| | | | | |
|---|---|---|---|---|
| 6,490,451 | B1 * | 12/2002 | Denman et al. ................ | 455/436 |
| 6,856,616 | B1 * | 2/2005 | Schuster et al. ............... | 370/352 |
| 7,184,427 | B1 * | 2/2007 | Carew et al. ................... | 370/352 |
| 7,313,593 | B1 * | 12/2007 | Pulito et al. .................... | 709/204 |
| 7,451,207 | B2 * | 11/2008 | Oliver ............................ | 709/224 |
| 7,675,902 | B2 * | 3/2010 | Qiao .............................. | 370/352 |
| 2002/0087858 | A1 * | 7/2002 | Oliver et al. ................... | 713/156 |
| 2002/0150083 | A1 | 10/2002 | Fangman et al. | |
| 2003/0193696 | A1 * | 10/2003 | Walker et al. ................. | 358/402 |
| 2003/0202521 | A1 | 10/2003 | Havinis et al. | |
| 2004/0010582 | A1 * | 1/2004 | Oliver ........................... | 709/224 |

(Continued)

FOREIGN PATENT DOCUMENTS

CN 1373971 A 10/2002

(Continued)

OTHER PUBLICATIONS

State Intellectual Property Office of the People's Republic of China, Examination Report in Chinese Patent Application No. (Jan. 8, 2010).

(Continued)

*Primary Examiner* — Jayanti K Patel
*Assistant Examiner* — Hooman Houshmand
(74) *Attorney, Agent, or Firm* — Leydig, Voit & Mayer, Ltd.

(57) ABSTRACT

The embodiments of the present invention disclose a method and device for controlling media resources, and a method and system for establishing calls. The method for controlling media resources includes the steps of: indicating source attributes of at least one of locally transmitted media and locally received media to a first media gateway, which also includes: receiving source attributes of locally transmitted media reported from the first media gateway; when the source attributes of locally transmitted media and destination attributes of locally received media of the first media gateway are at least partly identical, determining the source attributes of locally transmitted media by receiving the destination attributes of locally received media reported from the first media gateway.

3 Claims, 2 Drawing Sheets

U.S. PATENT DOCUMENTS

| | | | |
|---|---|---|---|
| 2004/0042485 A1* | 3/2004 | Gettala et al. | 370/465 |
| 2005/0105495 A1 | 5/2005 | Hollis et al. | |
| 2005/0157701 A1* | 7/2005 | Hoffmann et al. | 370/352 |
| 2008/0273504 A1* | 11/2008 | Foley | 370/337 |

FOREIGN PATENT DOCUMENTS

| | | |
|---|---|---|
| CN | 1708141 A | 12/2005 |

OTHER PUBLICATIONS

PCT Written Opinion of the International Searching Authority (Sep. 6, 2007).

"Telecommunications and Internet Converged Services and Protocols for Advanced Networking (TISPAN); Gate Control Protocol," *ETSI*, ETSI TS 102 333 V1.1.2: 1-30 (Jul. 2004).

"Telecommunications and Internet Converged Services and Protocols for Advanced Networking (TISPAN); Resource and Admission Control: H.248 Profile for Controlling Border Gateway Functions (BGF) in the Resource and Admission Control Subsystem (RACS); Protocol Specification," *ETSI*, Final Draft ETSI ES 283 018 V1.1.1: 1-35 (Mar. 2006).

"H.248.1—Infrastructure of Audiovisual Services—Communication Procedures," Sep. 2005, International Telecommunication Union, Geneva, Switzerland.

1st European Office Action from the European Patent Office in corresponding European Patent Application No. 07721349.6 (Jul. 21, 2010).

3rd European Office Action from the European Patent Office in corresponding European Patent Application No. 07118202.6 (Mar. 9, 2010).

European Summons to Attend Oral Proceedings in corresponding European Patent Application No. 07118202.6 (Aug. 17, 2010).

* cited by examiner

METHOD AND DEVICE FOR CONTROLLING MEDIA RESOURCES, METHOD AND SYSTEM FOR ESTABLISHING CALLS

CROSS-REFERENCE TO RELATED APPLICATIONS

This application is a continuation of International Patent Application No. PCT/CN2007/001775, filed Jun. 5, 2007, which claims priority to Chinese Patent Application No. 200610083549.7, filed Jun. 5, 2006, and Chinese Patent Application No. 200610141146.3, filed Oct. 13, 2006, all of which are hereby incorporated by reference in their entirety.

FIELD OF THE INVENTION

The present invention relates to field of communication technologies, and, in particular, to a media resource control method and device and a call establishment method and system.

BACKGROUND OF THE INVENTION

Along with development of telecommunication technologies, the traditional Public Switched Telephone Network (PSTN), primarily oriented to circuit switching, is in gradual transition to the Next Generation Network (NGN), primarily oriented to packet switching. Transmission in the packet network is based on Internet Protocol (IP)/Asynchronous Transfer Mode (ATM), which can unload a large amount of data in the PSTN network into the IP network to alleviate a heavy burden on the PSTN network. Furthermore, the packet network can add numerous new services or enhance old services with the use of new features of IP technologies, thereby making it possible to realize convergence of voice, video, data services, etc., over the communication network.

In communication over the packet network, media resource control is required during establishment of a call connection, switching of a service, etc. For example, both transmission parties need to negotiate about media capabilities prior to transmission of a media stream so as to obtain information of each other's reception addresses, codec (coding and decoding) types, etc. Existing media resource control methods primarily perform based upon destination attributes of media of both transmission parties. Taking the H.248 protocol in popular use as an example, the H.248 protocol defines the Local descriptor carrying destination attributes of locally received media and the Remote descriptor carrying destination attributes of locally transmitted media. The destination attributes of media carried in the Local and Remote descriptors are bearer-dependent and typically include an IP address, a port number, a codec type and parameters thereof, etc., of locally received media, for example, in the case of an IP bearer. The Local and Remote descriptors reflecting received media capabilities and attributes of both call parties are reported in messages to a Media Gateway Controller (MGC) through a Media Gateway (MGW) to which the user belongs, and are sent via the MGC to exchange media resource capabilities.

In the above media resource control method, since the Local and Remote descriptors only relate to destination attributes of media of both transmission parties, if destination attributes of media provided from a termination are inconsistent with source attributes, for example, if the termination is provided with a video display capability but without a video transmission capability, or if different addresses are used for transmitted and received media, then it is difficult to notify the remote end through negotiation in the existing control method. Further to basic call establishment, an IP termination with use of the Real-Time Transport Protocol (RTP) or another protocol on the belonged MGW has to process all of received packets consistent with its destination attributes of received media, without distinguishing between an attacking IP packet and an legal IP packet; and if attack IP packets or trash IP packets are attacking, then a large amount of system resources have to be occupied to process, such IP packets. For a reception termination of a unidirectional media stream, the reception termination also has to process a media stream originating from other transmission termination than the unidirectional media stream transmission termination upon reception thereof; thus, wasting system resources.

SUMMARY OF THE INVENTION

Embodiments of the invention provide a media resource control method and a call establishment method and device, which can meet a condition in which a gateway effectively prevents an attack, reject an illegal media packet, and save system resources.

Technical solutions adopted in the embodiments of the present invention include:

A media resource control method includes: indicating source attributes of locally transmitted and/or received media to a first media gateway.

A media resource control method includes:
receiving source attributes of locally transmitted and/or received media indicated by a media gateway controller; and
communicating with a second media gateway, in accordance with the indication.

A media resource control device includes a transmission unit and a source attribute indication unit which is adapted to indicate source attributes of locally transmitted and/or received media to a first media gateway through the transmission unit.

A media gateway includes:
a reception unit, adapted to receive source attributes of locally transmitted and/or received media indicated by a media gateway controller; and
a communication unit, adapted to communicate with the remote end, in accordance with the indication.

A call establishment method for establishing a call between a first media gateway and a second media gateway includes:
indicating source attributes of locally received media of the second media gateway in accordance with source attributes of locally transmitted media reported from the first media gateway; and
indicating source attributes of locally received media of the first media gateway, in accordance with source attributes of locally transmitted media reported from the second media gateway.

A call establishment system includes a first media gateway, a second media gateway, and a media gateway controller, wherein:
the first media gateway is adapted to add a calling termination in response to an instruction from the media gateway controller, to report source attributes of locally transmitted media to the media gateway controller, and to receive source attributes of locally received media indicated by the media gateway controller;
the second media gateway is adapted to add a called termination in response to an instruction from the media gateway controller, to report source attributes of locally transmitted media to the media gateway controller, and to receive source attributes of locally received media indicated by the media gateway controller; and the media gateway controller is adapted to instruct the first media gateway and the second media gateway to add the calling and called terminations respectively; indicate the source attributes of locally received media of the second media gateway in accordance with the source attributes of locally transmitted media reported from the first media gateway; and indicate the source attributes of locally received media of the first media gateway in accordance with the source attributes of locally transmitted media reported from the second media gateway.

According to the embodiments of the present invention, in media resource control, source attributes of transmitted and/or received media are indicated. Since the source attributes of media used at a termination can be described, the remote end can be notified conveniently when destination attributes of media used at the termination are inconsistent with the source attributes; control can also be made conveniently in a scenario where only descriptions of source attributes but no descriptions of destination attributes are required; and since a media gateway can obtain descriptions of source attributes of media from indications from a media gateway controller, such a condition can be met in which the media gateway can determine legality of a received media packet in accordance with source attributes of the received media packet to thereby avoid processing of a trash message, prevent an attack, and save system resources.

BRIEF DESCRIPTION OF THE DRAWINGS

The invention will be further detailed hereinafter in connection with the embodiments with reference to the drawings.

DETAILED DESCRIPTION OF THE INVENTION

An embodiment of the invention provides a media resource control method, which performs an operation of reporting and/or indicating source attributes of a media in media resource control. For negotiation in media resource control, a media gateway controller when indicating source attributes of locally received media to a media gateway (i.e. a first media gateway) can use source attributes of locally transmitted media reported from a remote media gateway (i.e. a second media gateway); and for a non-negotiation process in media resource control, the media gateway controller can also indicate source attributes of locally received media to the media gateway to satisfy a requirement of gating, etc. An operation on source attributes of media can be performed concurrently with or separately from an operation on destination attributes of media. For the H.248 protocol in popular use, source attributes of media can be carried in different ways, for example, by extending the framework of the H.248 protocol with addition of a corresponding descriptor or by extending a packet in an H.248 message and using an attribute or signal of the packet or by extending the definition of an original descriptor and using the original descriptor with addition of a new attribute identifier for distinguishing, etc. The invention further provides a call establishment method using the above media resource control process. A process of the invented method and its implementation method applied to a specific protocol will be detailed below.

Embodiment 1

A media recourse control method includes the following.

A media gateway reports to a media gateway controller source attributes of locally transmitted media, which include specific contents dependent upon a bearer mode of media. For example, for an IP-based bearer of media, the source attributes of media can include an source IP address, port number, media type, codec and parameters thereof, etc., of transmitted media; and for an ATM-based bearer of media, the source attributes of media can include an source address, Backbone Network Connection-Identifier (BNC-ID), media type, codec and parameters thereof, etc., of transmitted media.

Source attributes of transmitted media can be reported separately or concurrently with an existing process of reporting destination attributes of received media. Destination attributes of media have a similar scope to that of source attributes, and source attributes of locally transmitted media and destination attributes of locally received media can be identical or different.

The media gateway controller indicates source attributes of locally transmitted and/or received media to a media gateway. The media gateway controller performs control of media resource through an indication operation. For example, the media gateway controller can use source attributes of locally transmitted media reported from a calling media gateway to indicate source attributes of locally received media to a called media gateway for negotiation about media capabilities. In another example, the media gateway controller can specify source attributes of locally received media of a media gateway for the purpose of gating, etc., for example, by filtering packets with the source attributes of received media to determine whether the source of a media packet is legal, etc. In still another example, the media gateway controller can specify corresponding source attributes of locally transmitted media for a media gateway in accordance with destination attributes of locally received media reported from the media gateway for the purpose of flexible control, etc.

In analogy to the process of reporting source attributes, source attributes of transmitted and received media can be indicated separately or concurrently with an existing process of indicating destination attributes of transmitted and received media.

In a specific protocol, the above processes of reporting and indicating respective attributes can be performed by carrying a relevant attribute or signal in a command or message. Taking the H.248 protocol as an example, destination attributes of locally received and transmitted media can be carried, respectively, in the descriptors of Local and Remote with those attributes in the descriptors expressed in a format specified in the Session Description Protocol (SDP), which is typically as follows:

```
Local{
v=0
c=IN IP4 10.11.1.1
m=audio 10000 RTP/AVP 4
a=ptime:30
}
``` where "v" stands for "version" indicating the version number of the SDP in use; "c" stands for "connection" indicating a connection attribute, "IN IP4" following "c=" indicates Internet IPV4 is used as a network layer protocol, and "10.11.1.1" indicates an IP address; "m" stands for "media" indicating a media attribute, the field "audio" following "m=" indicates the media type of audio (or "video", etc.), "1000" indicates an IP port number, and "RTP/AVP" indicates the RTP/AVP protocol in use. "4" indicates the codec type of G.723; "a" stands for "attribute" indicating an attribute, the field of "ptime" following "a=" indicates the attribute of packet time and "30" following ":" indicates the value 30 of the attribute, i.e. a 30 ms-packet time of an audio stream at the termination. The descriptor of Remote is expressed in the same form as that of the description of Local.

In view of as few modifications to the existing protocol as possible, destination attributes of locally received and transmitted media can still be carried in the above form of the descriptors of Local and Remote, and source attributes of locally received and transmitted media can be carried differently in the embodiment of the present invention, detailed descriptions of several main solutions for the latter of which will be given below.

The First Solution:

The framework of the H.248 protocol is extended in a way that descriptors of Localfrom and Remotefrom carrying source attributes of locally transmitted and received media are added in correspondence with the descriptors of Local and Remote in the same expression form as that of the descriptors of Local and Remote, for example:

```
Localfrom{
v=0
c=IN IP4 10.11.1.1
m=audio 10000 RTP/AVP 4
a=ptime:30
}
```

In this solution, it can be specified in view of compatibility with the protocol before the extension that the absence of the descriptors of Localfrom and Remotefrom during negotiation indicates that a MGW uses the same source address of locally transmitted media as that of Local descriptor and the same source address of locally received media as that of Remote descriptor, or that the MGW self-decides source attributes of locally transmitted media and determines whether source attributes of locally received media are legal without negotiation, thereby attaining full compatibility with the H.248 protocol before the extension of the two descriptors.

Furthermore, a media gateway controller can also be allowed not to carry the descriptor of Localfrom and/or Remotefrom in a request message, but a media gateway can carry the descriptor of Localfrom and/or Remotefrom in a reply message, and the two descriptors can use part or all of attributes in the descriptor of Local and/or Remote.

The Second Solution:

Source attributes of locally transmitted and received media can be carried in a H.248 message by packet extension. In a specific implementation solution, a packet is defined to describe source attributes of media, and two attributes of the defined packet are defined, respectively, as Localfrom and Remotefrom. These attributes can be put in a descriptor of localControlDescriptor. A data type of the attributes can be the type of character string, simply in a format of SDP character string or in another format, as long as the same or part (e.g. with descriptions of only a source address, port number, etc.) information as that in the descriptors of Localfrom and Remotefrom in the first solution is carried. Alternatively, a plurality of attributes can also be defined to carry, respectively, various information contained in source attributes of media to be carried. This solution has an advantage of no modification to the framework of the H.248 protocol. Since the packet in the H.248 protocol is open-defined, it is sufficient that a MGC and MGWs of both parties can identify and process the definition of an attribute. The same effect as that in the first solution can be achieved if the same information is carried using the attributes of the packet where the descriptors of Localfrom and Remotefrom are used in a specific implementation of the first solution. The media gateway controller can know from auditing whether a media gateway supports this extension packet. Additionally, in the packet, an attribute can be defined to describe whether the media gateway checks a source address upon reception of a media message, and an attribute can be defined to describe whether the media gateway is requested to report source attributes. The two attributes can be sent to the media gateway from the media gateway controller.

In the second solution, the above carrying process can also be accomplished with a signal and parameters thereof instead of the attribute in substantially the same way as that of adding a new attribute described above.

The Third Solution:

The definitions of the descriptors of Local and Remote are extended in a way that a command line in the SDP indicates whether a group of attributes describe source attributes of media or destination attributes of media. In this solution, the descriptor of Local carries destination attributes of locally received media and source attributes of locally transmitted media, and it is indicated in the SDP whether the media attributes are source attributes or destination attributes; and similar definitions apply to the descriptor of Remote. For compatibility with the descriptions in the existing H.248 protocol, the non-indicative SDP in Local can be deemed by default as describing destination attributes of locally received media; and descriptions of source attributes of locally transmitted media can be indicated with extension of new SDP syntax, for example, with addition of a new attribute line. Analogously in the descriptor of Remote, the non-indicative SDP in the descriptor of Remote can be deemed by default as destination attributes of locally transmitted media; and descriptions of source attributes of locally received media can be indicated with extension of new SDP syntax, for example, with addition of a new attribute line. An example is as follows:

```
Remote{
v=0
c=IN IP4 $
m=audio $ RTP/AVP 4
a=ptime:30
v=0
c=IN IP4 $
m=audio $ RTP/AVP 4
a=ptime:30
a=remotefrom
}
```

In the above SDP, the first group of media descriptions "v, c, m, a" as in the existing protocol are deemed by default as destination attributes of locally transmitted media; and the second group of media descriptions include an extended attribute line "a=remotefrom," and, therefore, the second group of media descriptions are descriptions of source attributes of locally received media.

If a H.248 message is binary encoded and Local and Remote are not SDP encoded but media attributes are described with tags other than C.11 in Appendix C of H.248.1, then source attributes and destination attributes can be distinguished by newly added values of the tags.

The Fourth Solution:

It is compulsively defined that source attributes of locally transmitted media and destination attributes of locally received media be partly or fully identical, and that source attributes of locally received media and destination attributes of locally transmitted media be partly or fully identical. For example, it is compulsively required that the same IP address and port (an ATM address and an BNC-ID in the case of an ATM-based bearer) shall be used for locally transmitted and received media at terminations, and, thus, an IP address and a port that shall be used for transmitted media (an ATM address and an BNC-ID in the case of an ATM-based bearer) are also described with the descriptions of destination attributes of media. In this case, the use of different addresses for transmitted and received media at a termination is not allowed, which may still be appropriate in most cases.

The media resource control method according to the embodiment of the present invention can be applied during negotiation about media capabilities in a process of call establishment, service switching, etc. Specifically, a media gateway controller exchanges destination attributes of received media and source attributes of transmitted media of calling and called terminations between the calling and called media gateways, that is, destination attributes of received media and source attributes of transmitted media of terminations reported from one media gateway are indicated to terminations of the other media gateway as destination attributes of transmitted media and source attributes of received media. When the above media negotiation process occurs during establishment of a call, the media gateway controller shall add corresponding terminations on the calling and called media gateways; and when the above media negotiation process occurs during switching of a service, the media gateway controller modifies attributes of previously added terminations by exchange of attributes.

The media resource control method according to the embodiments of the present invention can also be applied in a non-negotiation process. For example, a media gateway controller indicates source attributes of locally received media to a media gateway during any phrase of a call for the purpose of gating, etc.

Hereinafter, an application example of negotiation in media resource control will be given according to the embodiment of the present invention during establishment of a call for further understanding of the invention.

Embodiment 2

Figure 1:
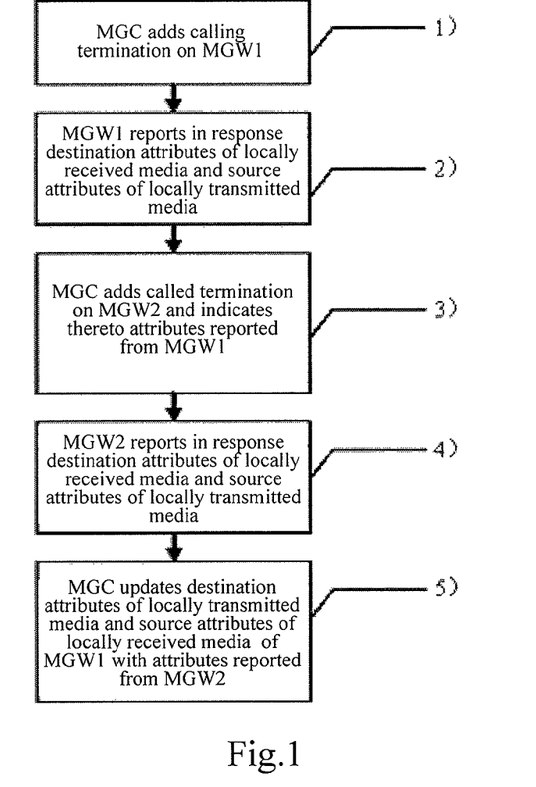
FIG. 1 is a schematic diagram of a flow of a call establishment method, according to a second embodiment of the present invention.

A call establishment method with a flow as illustrated in FIG. 1 includes:

1) A MGC adds a calling termination T1 and an IP termination on a media gateway MGW1 to which a calling user belongs;

2) The MGW1 reports in a reply to the MGC a context ID, the ID of the IP termination, and destination attributes of locally received media and source attributes of locally transmitted media of the IP termination;

3) The MGC adds a called termination T2 and an IP termination on a media gateway MGW2 to which a called user belongs, and the MGC indicates to the MGW2 the destination attributes of locally received media and source attributes of locally transmitted media of the IP termination at the calling side;

4) The MGW2 reports in a reply to the MGC a context ID, the ID of the IP termination, and destination attributes of locally received media and source attributes of locally transmitted media of the IP termination; and 5) The MGC indicates to the MGW1 the destination attributes of locally received media and source attributes of locally transmitted media of the IP termination at the called side. Thus, the IP terminations of the calling and called user obtain descriptions of transmission source attributes and reception destination attributes of remote ends and negotiation of media capabilities is completed, so that a media stream can be transmitted between T1 and T2.

This embodiment offers a typical example of negotiation in media resource control, according to the embodiment of the invention, which is applied during establishment of a call, and it shall be noted that the above establishment of the call connection terminations and specific process and sequence of exchanging the source attributes and destination attributes of media at the calling and called sides are merely intended to provide an illustration of a specific application process in the embodiment of the invention, but those skilled in the art can also adopt an alternative implementation flow catering to a corresponding practical need based upon different protocols and standardized architectures adopted in a communication network in light of the idea in the embodiment of the invention. For example, first the called terminations and then the calling terminations can be added, or first the media attributes of the called party can be indicated to the calling party and then the media attributes of the calling party can be indicated to the called party, etc. Therefore, the steps and sequence in the above flow shall not be considered as limiting the invention.

Figure 2:
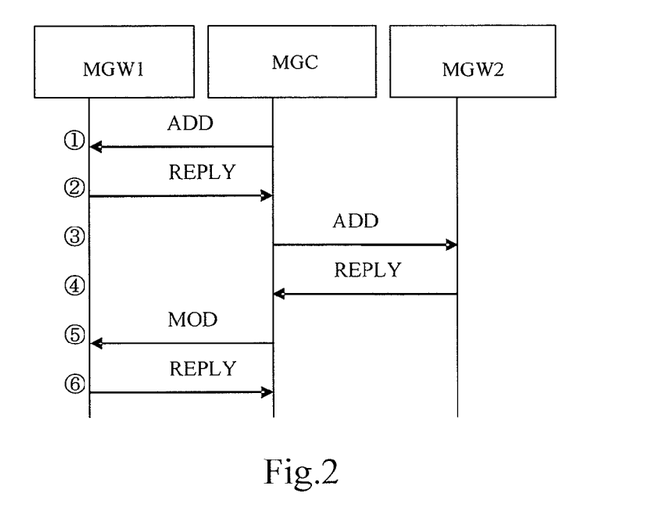
FIG. 2 is a schematic diagram of a signaling flow of a call establishment process using the H.248 protocol in the second embodiment of the present invention.

If the H.248 protocol is used, a signaling flow of the above call establishment as illustrated in FIG. 2 includes:

(1) The MGC sends a H.248 ADD command to the MGW1 to create a context, put a calling termination T1 in the context, and add an IP termination in the context;

(2) The MGW1 returns to the MGC a reply message REPLY in response to the ADD command to return the ID of C1 of the context and the ID of RTP/1 of the IP termination and report destination attributes of received media and source attributes of transmitted media of the IP termination of RTP/1;

(3) The MGC sends a H.248 ADD command to the MGW2 to create a context, put a called termination T2 in the context and add an IP termination in the context; wherein the destination attributes of received media and the source attributes of transmitted media of RTP/1 reported from the MGW1 are carried in the ADD command;

(4) The MGW2 returns to the MGC a reply message REPLY in response to the ADD command to return the ID of C2 of the context and the ID of RTP/2 of the IP termination and report destination attributes of received media and source attributes of transmitted media of the IP termination of RTP/2;

(5) The MGC sends a command MOD to the MGW1 to specify destination attributes of transmitted media and source attributes of received media of RTP/1, respectively, as the destination attributes of received media and the source attributes of transmitted media of RTP/2 reported from the MGW; and (6) The MGW1 responds to the MGC with a reply message REPLY, thereby completing call establishment.

Hereinafter, with reference to the above signaling flow, applications of the first and third solutions provided in the first embodiment in specific scenarios will be detailed (an application of the second solution which achieves the function of an extension descriptor in the first embodiment by packet extension is in analogy to that of the first embodiment and therefore repeated descriptions thereof will be omitted):

An Application of the First Solution:

In Step (1) of the above signaling flow, the ADD command sent from the MGC to the MGW1 shall include the descriptors of Local and Localfrom in the SDP as follows:

```
Local{
v=0
c=IN IP4 $
m=audio $ RTP/AVP 4
a=ptime:30
v=0
c=IN IP4 $
m=audio $ RTP/AVP 0
},
Localfrom{
v=0
c=IN IP4 $
m=audio $ RTP/AVP 4
a=ptime:30
v=0
c=IN IP4 $
m=audio $ RTP/AVP 0
}
```

The IP port address and port number being "$" in the above descriptors of Local and Localfrom indicate that values of these attributes shall be reported from the MGW1 to the MGC, and two groups of attributes with different codes types given respectively indicate that the MGC requests the MGW1 to select supported codec respectively for received/transmitted media between G.711 and G.723. Additionally, when the attributes in Localfrom are the same as those in Local, the descriptor of Localfrom may not be carried, but it can be carried in the reply message from the media gateway.

If the MGW1 intends to receive media by G.723 with a reception address of 124.124.124.222 and a port number of 2222 and to transmit media by G.711 with a transmission address of 124.124.124.444 and a port number of 4444, then the following SDP descriptors of Local and Localfrom can be put in the REPLY message returned in Step (2):

```
Local{
v=0
c=IN IP4 124.124.124.222
m=audio 2222 RTP/AVP 4
a=ptime:30
},
Localfrom{
v=0
c=IN IP4 124.124.124.444
m=audio 4444 RTP/AVP 0
}
```

In Step (3), the MGC sends the H.248 ADD command to the MGW2 by putting respectively in the descriptors of Remote and Remotefrom and sending to the MGW2 the obtained destination attributes of received media and source attributes of locally transmitted media of the MGW1, and also requests the MGW2 to report IP addresses and ports selected for transmitted and received media. The SDP descriptors of Local, Localfrom, Remote, and Remotefrom in the ADD command of this step are as follows (slightly different from Local and Localfrom in Step (1), the MGC has selected the same codec G.711 in the descriptor of Local as Remotefrom and the same codec G.723 in the descriptor of Localfrom as Remote in order to correspond with the codec of transmitted and received media of the MGW1):

```
Local{
v=0
c=IN IP4 $
m=audio $ RTP/AVP 0
},
Localfrom{
v=0
c=IN IP4 $
m=audio $ RTP/AVP 4
a=ptime:30
},
Remote {
v=0
c=IN IP4 124.124.124.222
m=audio 2222 RTP/AVP 4
a=ptime:30
},
Remotefrom{
v=0
c=IN IP4 124.124.124.444
m=audio 4444 RTP/AVP 0
}
```

In Step (4), the MGW2 reports the IP addresses and ports selected for received/transmitted media in the REPLY message returned, for a reception address of 125.125.125.111 and a port number of 6666, and a transmission address of 125.125.125.333 and a port number of 8888, the SDP descriptors of Local and Localfrom in the REPLY message are as follows:

```
Local{
v=0
c=IN IP4 125.125.125.111
m=audio 6666 RTP/AVP 0
},
Localfrom{
v=0
c=IN IP4 125.125.125.333
m=audio 8888 RTP/AVP 4
a=ptime:30
}
```

In Step (5), the MGC sends the MOD command to the MGW1 to modify its attributes of Remote and Remotefrom, in accordance with the descriptors of Local and Localfrom reported from the MGW2 and the SDP descriptors of Remote and Remotefrom in the MOD command are as follows:

```
Remote{
v=0
c=IN IP4 125.125.125.111
m=audio 6666 RTP/AVP 0
},
Remotefrom{
v=0
c=IN IP4 125.125.125.333
m=audio 8888 RTP/AVP 4
a=ptime:30
}
```

Then, in Step (6), the MGW1 returns an acknowledgement reply, which may not contain the descriptors of Local, Localfrom, Remote, and Remotefrom, thereby completing call establishment.

An Application of the Third Solution (with the Same Selected Parameter Values as in the Application of the First Solution):

In Step (1), the ADD command sent from MGC to the MGW1 includes the following SDP descriptor of Local:

```
Local{
v=0
c=IN IP4 $
m=audio $ RTP/AVP 4
a=ptime:30
v=0
c=IN IP4 $
m=audio $ RTP/AVP 0
v=0
c=IN IP4 $
m=audio $ RTP/AVP 4
a=ptime:30
a=localfrom
v=0
c=IN IP4 $
m=audio $ RTP/AVP 0
a=localfrom
}
```

It is noted that the attribute line "a=localfrom" in the above SDP, which is an extended attribute line, indicates that the descriptions of the group of media attributes are for source attributes of media. The two lines "a=localfrom" indicates that the descriptions of the third and fourth groups of media attributes are for source attributes of media.

In Step (2), the SDP descriptor of Local in the REPLY message returned from the MGW1 is as follows:

```
Local{
v=0
c=IN IP4 124.124.124.222
m=audio 2222 RTP/AVP 4
a=ptime:30
v=0
c=IN IP4 124.124.124.444
m=audio 4444 RTP/AVP 0
a=localfrom
}
```

The above descriptor of Local and the descriptors of Local and Localfrom of this step in the application of the first solution convey the same contents in different ways.

In Step (3), the MGC sends to the MGW2 the H.248 ADD command, including the following SDP descriptors of Local and Remote:

```
Local{
v=0
c=IN IP4 $
m=audio $ RTP/AVP 0
v=0
c=IN IP4 $
m=audio $ RTP/AVP 4
a=ptime:30
a=localfrom
},
Remote {
v=0
c=IN IP4 124.124.124.222
```

```
m=audio 2222 RTP/AVP 4
a=ptime:30
v=0
c=IN IP4 124.124.124.444
m=audio 4444 RTP/AVP 0
a=ptime:20
a=remotefrom
}
```

In Step (4), the SDP descriptor of Local in the REPLY message returned from the MGW2 is as follows:

```
Local{
v=0
c=IN IP4 125.125.125.111
m=audio 6666 RTP/AVP 0
v=0
c=IN IP4 125.125.125.333
m=audio 8888 RTP/AVP 4
a=localfrom
}
```

In Step (5), the MGC sends the MOD command to the MGW1 to modify its attributes of Remote, and the SDP descriptor of Remote in the MOD command is as follows:

```
Remote{
v=0
c=IN IP4 125.125.125.111
m=audio 6666 RTP/AVP 0
v=0
c=IN IP4 125.125.125.333
m=audio 8888 RTP/AVP 4
a=remotefrom
}
```

In the above application of the third solution, "a=localfrom" and "a=remotefrom" indicate, respectively, source attributes of locally transmitted media and source attributes of locally received media (i.e., remotely transmitted media). Alternatively, the same identifier, e.g. "a=sourceattr," can be used to indicate source attributes; and the identifier put in the descriptor Local indicates that the group where the line is located is for source attributes of locally transmitted media, and the identifier put in the descriptor of Remote indicates that the group where the line is located is for source attributes of locally received media (i.e. remotely transmitted media).

Those ordinarily skilled in the art can appreciate that all or part of the steps in the above embodiments of the method can be accomplished by a program instructing relevant hardware, which may be stored in a readable storage medium and which when being executed can include all or part of the steps in the above embodiments of the method. The storage medium may be a read-only memory, a random memory, a magnetic disk, and an optical disk, etc.

Figure 3:
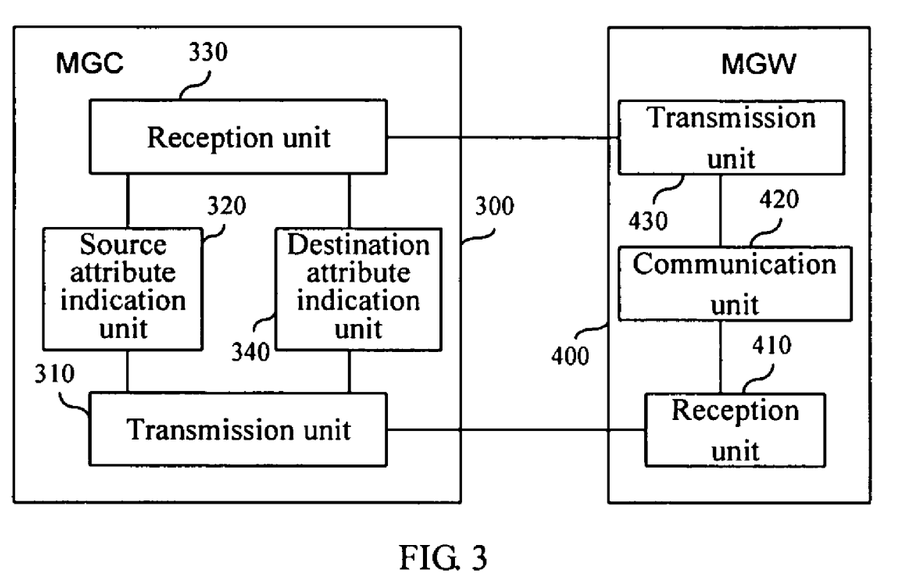
FIG. 3 is a schematic diagram of a structure of a media resource control system, according to an embodiment of the present invention.

FIG. 3 is a schematic diagram of a structure of a media resource control system, according to an embodiment of the invention. The media resource control method in the first embodiment can be applied to the system. The MGC 300 includes a transmission unit 310 and a source attribute indication unit 320, and it may also include a reception unit 330 and a destination attribute indication unit 340. The MGW 400 includes a reception unit 410 and a communication unit 420, and it may also include a transmission unit 430. Put simply, only one MGW is depicted in the Figure, and those skilled in the art can appreciate that other MGWs controlled by the same MGC can also be structured identically to the MGW 400.

The source attribute indication unit 320 of the MGC 300 is responsible for indicating source attributes of locally transmitted media and/or source attributes of locally received media to the media gateway; and the destination attribute indication unit 340 is responsible for indicating destination attributes of locally transmitted media to the media gateway. The transmission unit 310 of the MGC 300 is responsible for packet transmission including transmission of the indications of the source attribute indication unit 320 and the destination attribute indication unit 340 to the MGW 400; and the reception unit 330 of the MGC 300 is responsible for packet reception, including reception of source attributes of locally transmitted media and destination attributes of locally received media reported from the media gateway.

The source attribute indication unit 320 may include a source attribute reception module, and for two media gateways acting as the remote communication ends of each other, after the reception unit 340 receives source attributes of locally transmitted media reported from one media gateway, the source attribute reception module indicates the source attributes of locally transmitted media of the media gateway to the remote media gateway as the source attributes of received media. The source attribute indication unit 320 may further include a source attribute transmission module, and after the reception unit 340 receives destination attributes of locally received media of one media gateway, the source attribute transmission module indicates source attributes of locally transmitted media to the media gateway, in accordance with the destination attributes of locally received media of the one media gateway. Alternatively, the source attributes indication unit 320 can also indicate the source attributes of locally transmitted media of the media gateway directly.

The reception unit 410 of the MGW 400 is responsible for packet reception including reception of the source attributes of locally transmitted and/or received media indicated by the MGC 330; the communication unit 420 is responsible for communication with the remote MGC, in accordance with the indication from the MGC 300; and the transmission unit 420 is responsible for packet transmission including transmission of the source attributes of locally transmitted media and the destination attributes of locally received media to the MGC 300.

When the MGC 300 indicates the source attributes of locally transmitted media to the MGW 400, a source attribute module included in the communication module 420 of the MGW 400 communicates with the remote end with use of the source attributes of locally transmitted media indicated by the MGC 300. When the MGC 300 indicates the source attributes of locally received media to the MGW 400, a packet filter module included in the communication module 420 of the MGW 400 filters received packets, in accordance with the source attributes of locally received media indicated by the MGC 300, for example, determines whether a received packet is derived from a legal remote end, in accordance with a source address and a source port of the received packet.

The above source attributes of transmitted and received media may include a media type, a network address and port, and/or a codec type used at a transmission end. The H.248 protocol can be used for communication between the MGC 300 and the MGW 400, and the source attributes of transmitted and received media can be carried in a SDP descriptor or in an attribute or signal of a packet in a H.248 message.

The invention further provides a call establishment system to which the call establishment method in the second embodiment can be applicable, which includes a first media gateway to which a calling user belongs, a second media gateway to which a called user belongs, and a media gateway controller.

During establishment of a call, the media gateway controller instructs the first media gateway to add a calling termination; the first media gateway adds the calling termination and reports source attributes of locally transmitted media and destination attributes of locally received media in a response to the media gateway controller; the media gateway controller instructs the second media gateway to add a called termination and indicates to the second media gateway the source attributes of locally transmitted media and the destination attributes of locally received media reported from the first media gateway, respectively, as source attributes of locally received media and destination attributes of locally transmitted media; the second media gateway adds the called termination and reports source attributes of locally transmitted media and destination attributes of locally received media in a response to the media gateway controller; the media gateway controller indicates to the first media gateway the source attributes of locally transmitted media and the destination attributes of locally received media reported from the second media gateway, respectively, as source attributes of locally received media and destination attributes of locally transmitted media; and the first media gateway responds to the media gateway controller, thereby establishing the call.

The following technical effects can be achieved with the technical solutions in the above embodiments of the present invention.

1) In media resource control, source attributes of media are reported and/or indicated, and since the source attributes of media used at a termination are described, the remote end can be notified conveniently when destination attributes of media used at the termination are inconsistent with the source attributes; control can be made conveniently in a scenario where only descriptions of source attributes but no descriptions of destination attributes are required; and since a media gateway can obtain descriptions of source attributes of media from indications of a media gateway controller, such a condition can be met in which the media gateway can determine legality of a received media packet, in accordance with information of a source address, a port, etc. of the media packet, to thereby avoid processing of a trash message and prevent an attack.

2) When the media gateway controller indicates source attributes of locally received media to the media gateway, the media gateway controller can specify one or use source attributes of locally transmitted media reported from the remote media gateway without being limited by the phrase of an ongoing call, thereby satisfying the requirement of gating, etc. and achieving flexible control.

3) The embodiments of the invention provide several specific methods of describing source attributes of media for the H.248 protocol in popular use to facilitate a selection dependent upon a practical application.

The media resource control method and the call establishment method according to the invention have been detailed above, the principle and embodiments of the invention have been set forth in this context by way of specific examples, and the foregoing descriptions of the embodiments are merely intended to facilitate understanding of the invented methods and the essential idea thereof. Also those ordinarily skilled in the art can make modifications to the embodiments and application scopes in light of the inventive idea. In summary, the disclosure of the specification shall not be construed as limiting the invention.

What is claimed is:

1. A media resource control method, comprising:

reporting, by a first media gateway, source attributes of locally transmitted media and locally received media to a media gateway controller, wherein the source attributes comprise at least one of a media type, a network address and port, and a codec type used at a transmission end;

receiving, by the media gateway controller, the source attributes of the locally transmitted media and the locally received media reported from the first media gateway;

determining, by the media gateway controller, the source attributes of the locally transmitted media according to destination attributes of locally received media of the first media gateway, when the source attributes of the locally transmitted media and the destination attributes of locally received media of the first media gateway are at least partly identical, wherein the destination attributes comprise at least one of media type, a network address and port, and a codec typed used at a reception end; and indicating, by the media gateway controller, the source attributes of at least one of locally transmitted media and locally received media to the first media gateway.

2. The media resource control method according to claim 1, further comprising receiving destination attributes of locally received media reported from the first media gateway; and wherein the indicating the source attributes of locally transmitted media to the first media gateway comprises: indicating the source attributes of locally transmitted media of the first media gateway in accordance with the destination attributes of locally received media reported from the first media gateway.

3. A non-transitory computer readable storage medium product, comprising computer program codes stored thereon, wherein, when executed by a computer, the computer program codes instruct the computer to perform steps of claim 1.

* * * * *